(12) United States Patent
Haynes et al.

(10) Patent No.: US 11,808,394 B2
(45) Date of Patent: Nov. 7, 2023

(54) SEAL SYSTEM

(71) Applicant: Lake Products Limited, Auckland (NZ)

(72) Inventors: Andrew Leo Haynes, Auckland (NZ); Christopher Charles Morrow, Auckland (NZ); James Robert Winton, Auckland (NZ); Gabriel Ioan Giurgiu, Auckland (NZ)

(73) Assignee: Lake Products Limited, Auckland (NZ)

( * ) Notice: Subject to any disclaimer, the term of this patent is extended or adjusted under 35 U.S.C. 154(b) by 376 days.

(21) Appl. No.: 17/164,005

(22) Filed: Feb. 1, 2021

(65) Prior Publication Data

US 2021/0239239 A1 Aug. 5, 2021

(30) Foreign Application Priority Data

Jan. 31, 2020 (NZ) ........................................ 761300

(51) Int. Cl.
*F16L 5/14* (2006.01)
*F16L 5/08* (2006.01)

(52) U.S. Cl.
CPC .. *F16L 5/14* (2013.01); *F16L 5/08* (2013.01)

(58) Field of Classification Search
CPC ....... F16L 5/00; F16L 5/02; F16L 5/14; F16L 5/08; F16J 15/50
See application file for complete search history.

(56) References Cited

U.S. PATENT DOCUMENTS

| | | | | |
|---|---|---|---|---|
| 6,051,790 A | * | 4/2000 | Takeuchi | B60R 16/0207 174/72 A |
| 6,278,060 B1 | * | 8/2001 | Mori | H02G 3/0475 174/152 G |
| 7,423,223 B2 | * | 9/2008 | Taira | B60S 1/48 174/152 G |
| 9,481,329 B2 | * | 11/2016 | Yoshimura | H01B 17/583 |
| 2015/0259891 A1 | * | 9/2015 | Ismert | E03C 1/12 137/360 |
| 2020/0070751 A1 | * | 3/2020 | Kimura | H02G 3/22 |

* cited by examiner

Primary Examiner — Gilbert Y Lee
(74) Attorney, Agent, or Firm — Foley & Lardner LLP (57) ABSTRACT

This invention relates to a seal system for sealing between an elongate element such as a cable and a surface or substrate around an aperture in the surface through which the elongate element passes. The seal system comprises a seal body to surround the aperture and seal against the surface or substrate around the aperture. The seal body comprises at least one passage for penetration of the elongate element through the seal body at a side of the seal body. The at least one passage providing for a seal to the elongate element. Also provided is a fixing component adapted to be attached over at least part of the seal body and/or through the seal body to seal with the surface or substrate.

24 Claims, 13 Drawing Sheets

SEAL SYSTEM

CROSS-REFERENCE TO RELATED APPLICATIONS

This application claims the benefit of and priority to New Zealand Application No. 761300, filed Jan. 31, 2020, which is incorporated herein by reference in its entirety.

FIELD OF INVENTION

The invention relates to a seal system for sealing between an elongate element such as a cable, and a surface or substrate around an aperture through which the cable passes.

BACKGROUND TO THE INVENTION

It is common to require a seal between a cable or pipe where the cable or pipe passes through an aperture, to prevent ingress or escape of fluid or gas, or ingress of dirt or contamination, for example. The aperture through which the cable or pipe passes may be in a substrate such as a wall, of an item of equipment large or small, or a building or room, or a vessel or tank, and the need may be to seal to the surface around the aperture.

It may also be required that the cable or pipe turn at the penetration, so that the cable or pipe enters the aperture from one side of the wall and turns in direction at the penetration to exit and pass along the wall on the other side of the wall.

SUMMARY OF INVENTION

An object of the invention is to provide an improved or at least alternative form of seal system for sealing between an elongate element such as a cable or pipe, and a surface or substrate around an aperture in the surface through which the cable or pipe passes.

In a first aspect, the invention may be said to broadly comprise a seal system for sealing between an elongate element and a surface or substrate around an aperture through which the elongate element passes, comprising: a seal system for sealing between an elongate element such as a cable and a surface or substrate around an aperture in the surface through which the elongate element passes, comprising:
  a seal to surround the aperture and seal against the surface or substrate around the aperture, the seal comprising at least one passage for penetration of the elongate element through the seal at a side of the seal, at which passage the seal also seals to the elongate element, and
  a fixing component adapted to attach over at least part of the seal and through the seal to or through the surface or substrate.

The seal may comprise an entry aperture through the seal and the at least one passage through a side of the seal comprises an exit aperture.

The at least one passage may pass laterally through a side of the seal at a non-zero angle to said entry aperture, such as substantially perpendicular to an axis through said entry aperture or to a major plane of the seal.

The seal may have an enlarged thickness at the side of the seal comprising the at least one passage for penetration of the elongate element through the seal.

The seal may comprise at least one sealing lip or protrusion around an under surface of the seal for sealing to the surface.

The seal may comprise at least one sealing lip or protrusion around the at least one passage through the side of the seal for sealing to the elongate element.

The seal may comprise at least one sealing lip or protrusion around an upper surface of the seal for sealing to the fixing component.

The seal may have a peripheral thickness which is greater at said side of the seal comprising the least one passage for penetration of the elongate element through the side of the seal, and the fixing component comprises a raised peripheral part shaped to accommodate the greater thickness peripheral part of the seal.

The fixing component may comprise a cover over the seal.

The cover may comprise a raised central part.

The fixing component and seal may comprise apertures which align when the fixing component is in place over the seal, for fasteners through the fixing component and seal to the surface or a substrate below the surface.

The seal system may further comprise a component adapted to interface to the seal and comprising an aperture for entry of the elongate element into the seal system.

The component may attach to an outer lead up tube for the elongate element to the seal system.

In a second aspect, the invention may be said to broadly comprise of a seal system for sealing between an elongate element such as a cable and a surface or substrate around an aperture in the surface through which the elongate element passes, comprising:
  a seal to surround the aperture and seal against the surface or substrate around the aperture, the seal comprising a peripheral part and a cover part bounded by the peripheral part, the cover part comprising at least one passage for penetration of the elongate element through cover part of the seal and at a non-zero angle to an entry aperture to the seal, which directs the elongate element to one side of the seal, and
  a fixing component adapted to attach over the peripheral part of the seal and through the seal to or through the surface or substrate.

The at least one passage through cover part of the seal at a non-zero angle may be in a laterally extending nose or nozzle portion of the cover part.

In a third aspect, the invention may be said to broadly comprise of a seal system for sealing between an elongate element such as a cable and a surface or substrate around an aperture in the surface through which the elongate element passes, comprising:
  a seal body to surround the aperture and seal against the surface or substrate around the aperture, the seal body comprising at least one passage for penetration of the elongate element through the seal body at a side of the seal body, said at least one passage providing for a seal to the elongate element, and
  a fixing component adapted to be attached over at least part of the seal body and/or through the seal body to seal with the surface or substrate.

The seal body comprises an entry aperture through the seal body and the at least one passage through a side of the seal body comprises an exit aperture.

The at least one passage may pass laterally through a side of the seal body at a non-zero angle to said entry aperture.

The non-zero angle may be at an angle which is substantially perpendicular to an axis through said entry aperture or to a major plane of the seal.

The seal body may have an enlarged thickness at the side of the seal body comprising the at least one passage for penetration of the elongate element through the seal body.

The seal body may comprise at least one sealing lip or protrusion around an under surface of the seal body for sealing to the surface.

The seal body may comprise at least one sealing lip or protrusion around the at least one passage through the side of the seal body for sealing to the elongate element.

The seal body may comprise at least one sealing lip or protrusion around an upper surface of the seal body for sealing to the fixing component.

The seal body may have a peripheral thickness which is greater at said side of the seal body comprising the least one passage for penetration of the elongate element through the side of the seal body, and the fixing component comprises a raised peripheral part shaped to accommodate the greater thickness peripheral part of the seal body.

The fixing component may comprise a cover over the seal body.

The cover may comprise a raised central part.

The fixing component may comprise of fixing component apertures and the seal body comprises of seal body apertures, wherein the fixing component apertures and seal body apertures are arranged respectively to be aligned with each other when the fixing component is in place over or upon the seal body.

In-use, the fixing component apertures and seal body apertures may be configured to receive a fastener therethrough for fixing of the fixing component and the seal body to the surface or a substrate below the surface.

A lead up component may be adapted to interface to the seal body and comprising an aperture for entry of the elongate element into the seal system.

The lead up component may attach to an outer lead up tube for the elongate element to the seal system.

The lead up component may comprise of lead up component apertures which are arranged to be aligned with respective aperture alignments of said fixing component and sealing body.

The lead up component may be connected to said fixing component in a pre-arranged manner, such that said lead up component apertures are aligned with fixing component apertures.

In a fourth aspect, the invention may be said to broadly comprise of a seal system for sealing between an elongate element such as a cable and a surface or substrate around an aperture in the surface through which the elongate element passes, comprising:
  a seal body to surround the aperture and seal against the surface or substrate around the aperture, the seal body comprising a peripheral part and a cover part bounded by the peripheral part, the cover part comprising at least one passage for penetration of the elongate element through the cover part of the seal body and at a non-zero angle to an entry aperture to the seal body, which directs the elongate element to one side of the seal body, and
  a fixing component adapted to attach over the peripheral part of the seal body and/or through the seal body to seal to seal with the surface or substrate.

The at least one passage through said cover part of the seal body at a non-zero angle may be in a laterally extending nose or nozzle portion of the cover part.

In this specification the term "comprising" means "consisting at least in part of". When interpreting a statement in this specification and claims that includes "comprising", features other than that or those prefaced by the term may also be present. Related terms such as "comprise" and "comprises" are to be interpreted similarly.

BRIEF DESCRIPTION OF THE FIGURES

The invention is further described with reference to the accompanying figures which show embodiments of a seal system of the invention, by way of example and without intending to be limiting. In the figures.

DETAILED DESCRIPTION OF EMBODIMENTS

Figure 1:
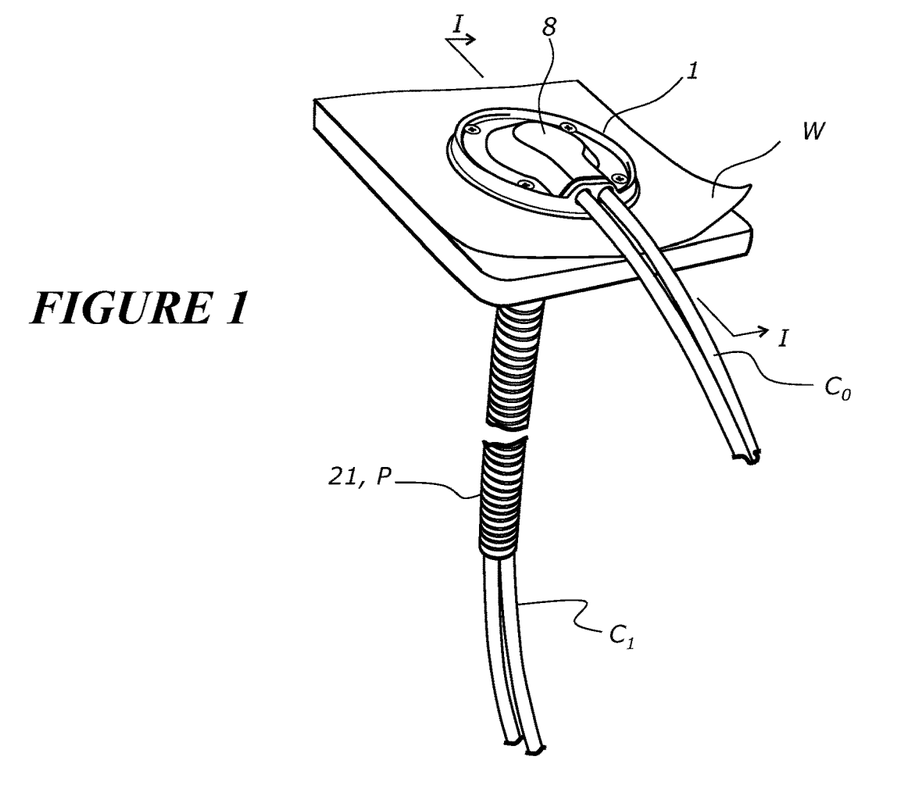
FIG. 1 is a perspective view of one embodiment of the seal system, and two cables, through an exemplary substrate section, from the cable exit side of the substrate.
Figure 2:
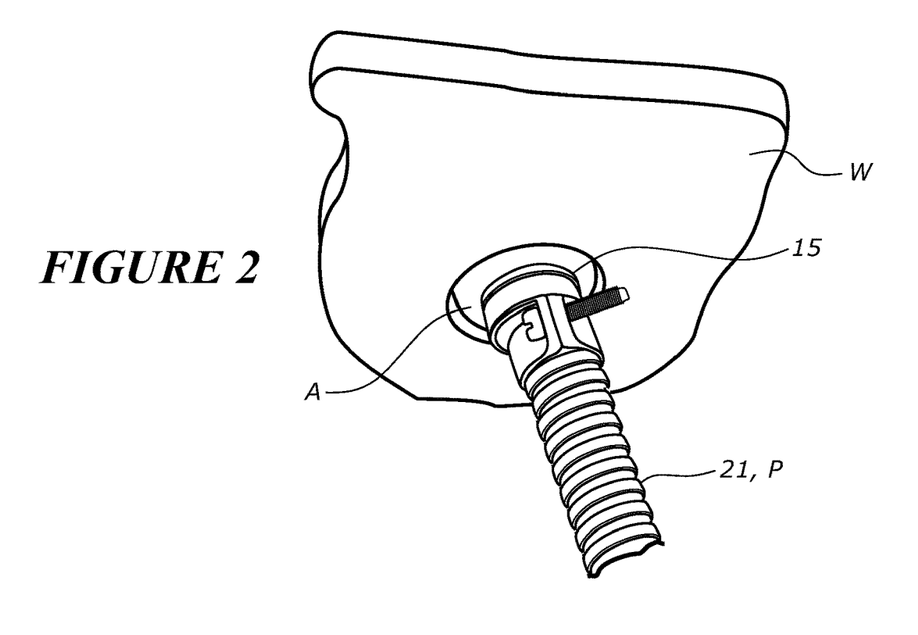
FIG. 2 is a perspective view of the seal system and two cables of FIG. 1 from the cable entry side of the substrate.
Figure 5:
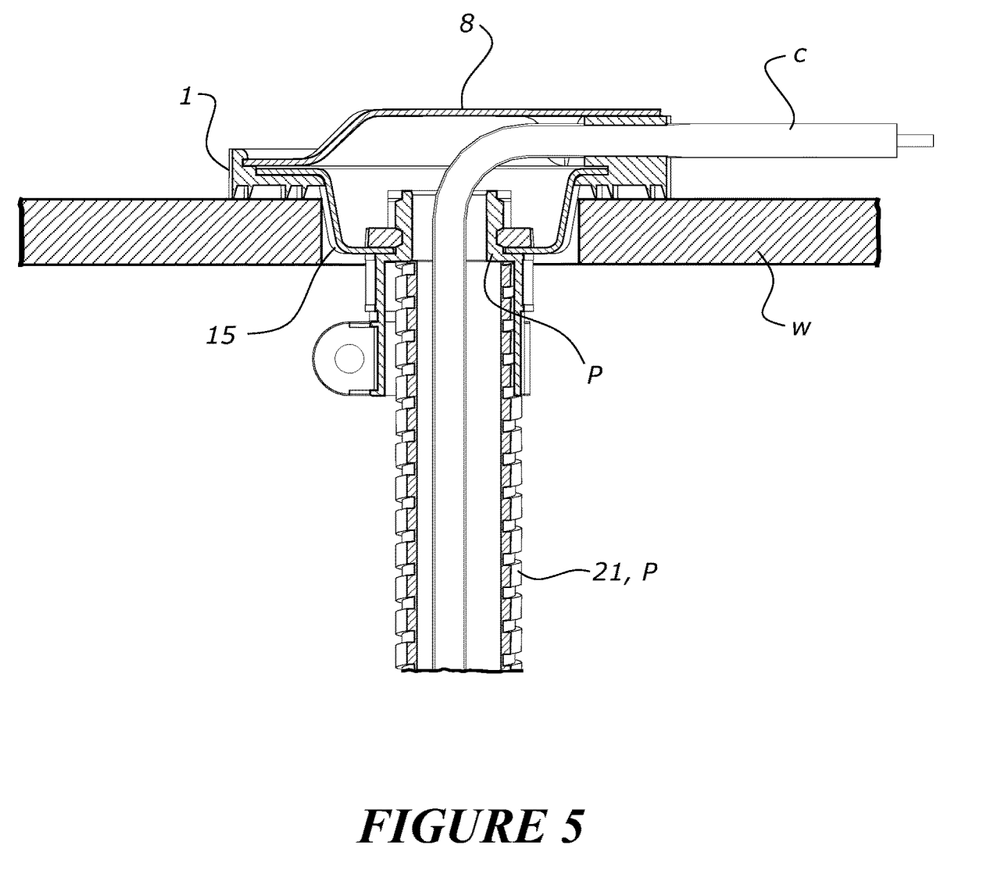
FIG. 5 is a cross-section view of the seal system, cables, and substrate section of FIGS. 1 and 2 along line I-I of FIG. 1.

Referring first to FIGS. 1 and 2, the embodiment of a seal system of the invention shown is intended for providing a sealing or seal between cables C passing through a wall W or similar, where it is also required that the cables turn at the penetration, so that the cables which enter the aperture A in the wall from one side—see the cables part indicated at C1, exit in a direction along the wall on the other side of the wall—see the cables part indicated at C0. In the embodiment shown the cables C1 on the entry side of the wall W are housed in a sheath, such as a flexible steel sheath, or a sleeve, as will be further described. Such a sheath or sleeve may be provided as protection for the cables C1 passing through and into component 15, for example protection from damage from contact or rubbing (such as friction) or sharp edges of the component 15 (as for example illustrated in FIG. 5 showing the cable(s) C entering the component 15, and subsequent seal system housing. The sheath or sleeve may be provided as a part of the cable C system, or alternatively, the cable(s) C may be provided with protection via a sheath or sleeve which may be connected or attached to the component 15 itself, which may allow for cable(s) C to be provided with an additional protector (cable sheath or sleeve as for example shown in FIG. 15 may be used in addition to a sheath or sleeve which is to be fitted to the component 15 as for example shown in FIG. 13 or 15). Such a protector sheath or sleeve or grommet type component is indicated as P in the accompanying figures.

Figure 3:
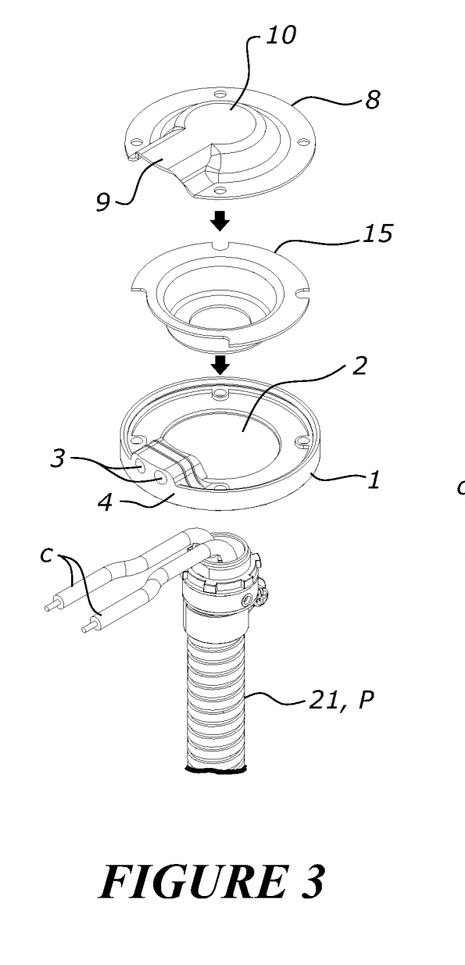
FIG. 3 is a fully exploded perspective view of parts of the seal system of FIGS. 1 and 2.
Figure 4:
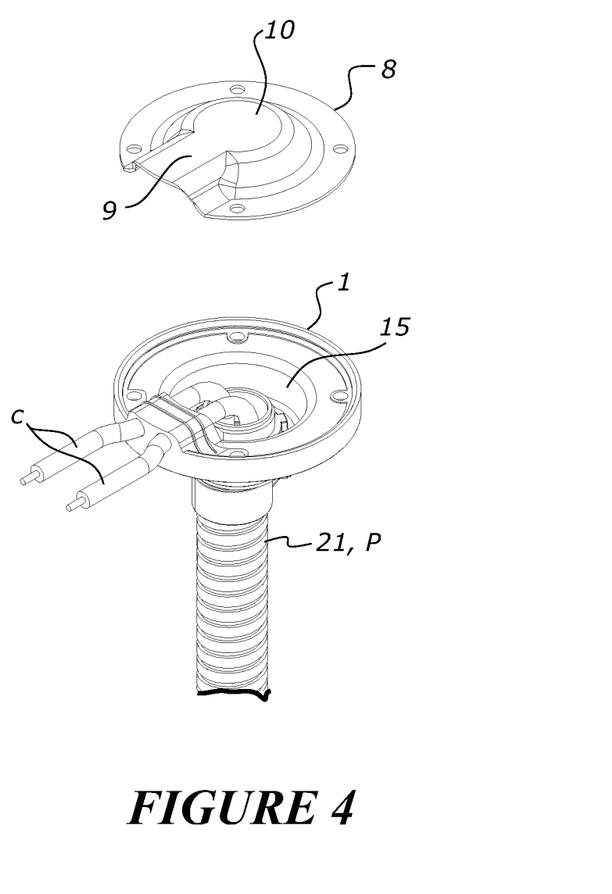
FIG. 4 is a partly exploded perspective view of parts of the seal system of FIGS. 1 and 2.

Referring in particular also to FIGS. 3 to 5, the seal system comprises a seal 1 (hereinafter referred to as a seal body), to surround the aperture A, and which in-use is positioned on one side of the wall W to seal against the wall surface (and seal in a manner surrounding of the aperture A).

In an alternative embodiment, the seal body 1, may shaped to also seal into and against the side walls of the aperture A. For example, the outer side walls of the seal body 1 may be shaped to accommodate the wall W aperture side wall surface, or can be shaped to provide for sealing against such wall W aperture side wall surfaces.

The seal body 1, comprises an entry aperture 2 through the seal body 2, and two passages labelled as item 3 or exit apertures through a side 4 (such as a side wall) of the seal body 1. As shown, the cable exit passages 3 passes laterally through the side 4 (or side wall) of the seal body 1 substantially perpendicular to an axis through the entry aperture 2 (or substantially perpendicular to the major plane of the seal body 1). However alternatively, the cable exit passage or passages 3 could be at any non-zero angle to the aperture 2 through the seal body 1, so that the cables exit the seal body 1 at any non-zero angle to the wall surface, such as about 30 or about 45 degrees for example. Also while the seal body 1 shown has two apertures 3 through the side of the seal body for accommodating two similarly sized cables, in another embodiment the seal body 1 may comprise a single cable aperture 3 or three or more cable apertures, and where there are two or more cable apertures 3 they may be of the same or different sizes.

Also, in the embodiment shown, the seal body 1 may have an enlarged thickness at the side 4 (or side wall) of the seal body 1 comprising the cable passages 3. However, in another embodiment the seal body 1 may have the same (such as a consistent or constant) thickness around its sides, i.e. the enlarged thickness at the side part 4 is not provided, and the cable aperture(s) 3 still passes through the side of the seal body 1.

In another embodiment, the seal body 1 may have multiple cable exit passage or passages 3 which exit the seal body 1 at different non-zero angles to the wall surface, for example one (or more) parallel to the wall surface, one (or more) at about a 30 degree angle to the wall surface, another (or more) at about a 45 degree angle to the wall surface, and another (or more) at about a 70 degree angle to the wall surface, for example. These may be spaced or arranged around the circumference or perimeter of the seal body 1 so that at installation the user can rotate the seal before fixing it in position, to select the angle at which the cable or cables will exit the seal system.

In a further embodiment, multiple cable apertures may be spaced or arranged around the circumference or perimeter of the seal body and may have different sizes i.e. different diameters, so that at installation the user can rotate the seal before fixing it in position, to select the cable exit aperture 3 through the side of the seal which fits the particular cable or cables.

Additionally, or alternatively to each of the above options, each cable aperture 3 through the seal body 1 may have a slightly reducing (tapering) internal diameter from the inside to the outside of the seal body 1 to help in sealing to slightly different diameter cables or cables having an uneven exterior surface. And additionally, or alternatively to each of the above options, to accommodate different diameter cables each cable aperture 3 may on its exit side have an integral extending nozzle of reducing diameter (diameter reducing in steps or a taper, such as a progressive taper) through which the cable is to pass. At installation the nozzle can be cut back in length, to fit the cable diameter.

Figure 6:
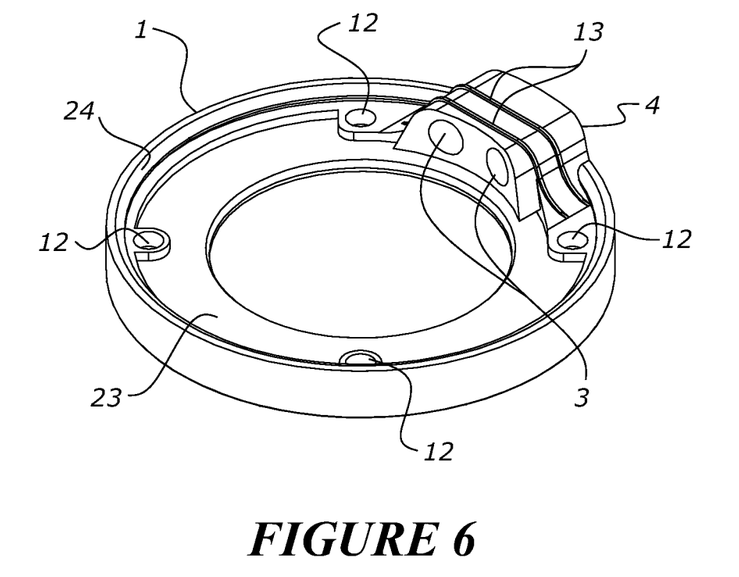
FIG. 6 is a top side perspective view of the seal.
Figure 7:
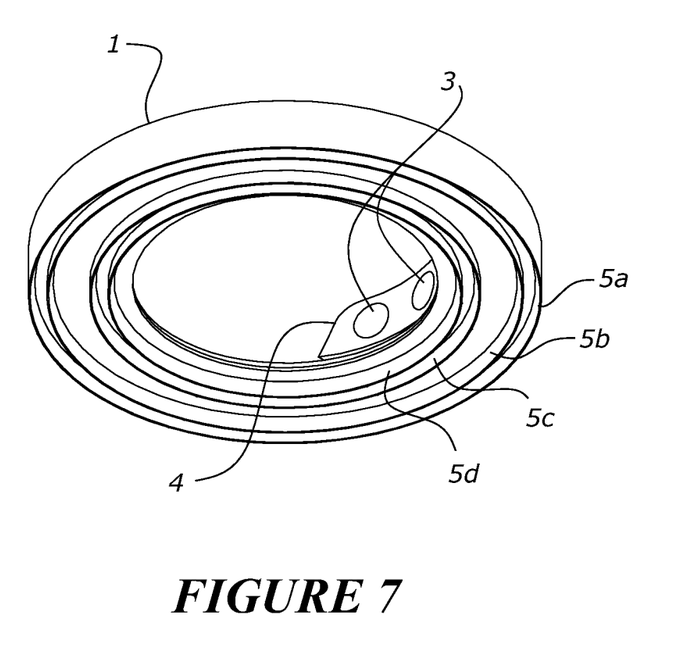
FIG. 7 is an underside perspective view of the seal.

Referring to FIGS. 6 and 7, on the lower or underside face of the seal body 1 which in-use is intended to contact the wall surface, the seal body 1 preferably comprises at least one sealing lip or protrusion to seal against the wall surface, and in the embodiment shown for example by FIGS. 5, 7, 12, 22, the seal body 1 may comprises of four annular sealing lips 5a-d around this under surface of the seal. Such sealing lips can be concentric endless lip seals. It will be appreciated that there may be fewer or more than four lip seals, for example at least one lip seal should be provided to facilitate for a seal against the wall surface upon which the seal body 1 is to be placed into sealing contact via the at least one lip seal.

Where a plurality of lip seals are provided, such lip seals may be spaced apart from each other to provide for a suitably sized gap or space through which a fixing, such as a screw, may be able to pass without interfering with the integrity of a lip seal or the seal being provided for against the wall surface by such lip seal. In once such example, FIG. 7 illustrates a gap or space between lip seal 5c and 5b for the above-mentioned purpose. Such a fixing is used to affix or anchor the sealing system securely to the wall surface.

Within the interior of or at the entry and/or exit of the cable passages 3, the seal body 1 may also comprise one or more sealing lips or protrusions for sealing to cable(s)

passing through the seal. In this manner, such cable passage lip seal(s) may facilitate sealing against the exterior surface of a cable passing through a cable passage 3.

The seal system also comprises a fixing component 8 adapted to attach over the seal body 1 and/or through the seal body 1. The fixing component 8 facilitates securement of a fixing (such as a screw or a nail) through the sealing body 1 and into or through the surface or substrate, such as the surface or substrate of the wall W.

Figure 8:
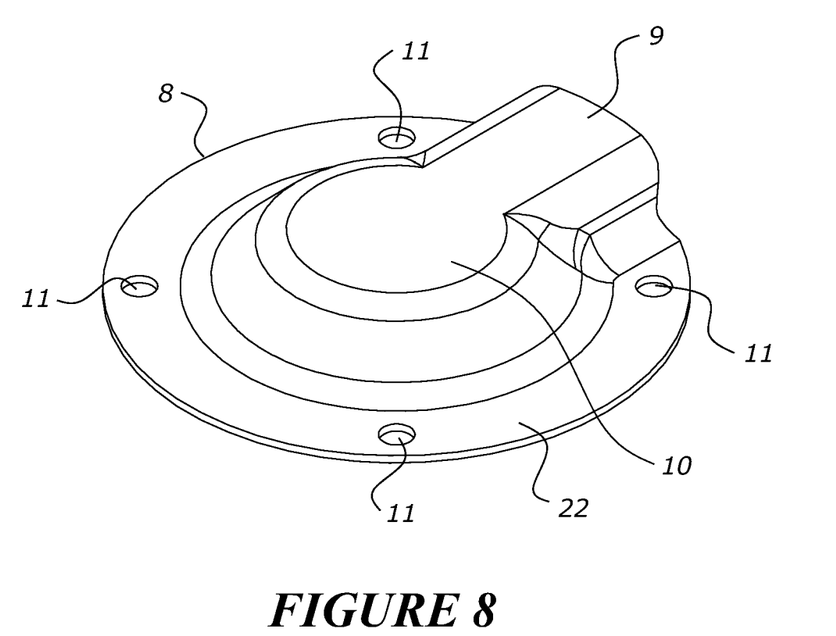
FIG. 8 is a top side perspective view of the fixing component.
Figure 9:
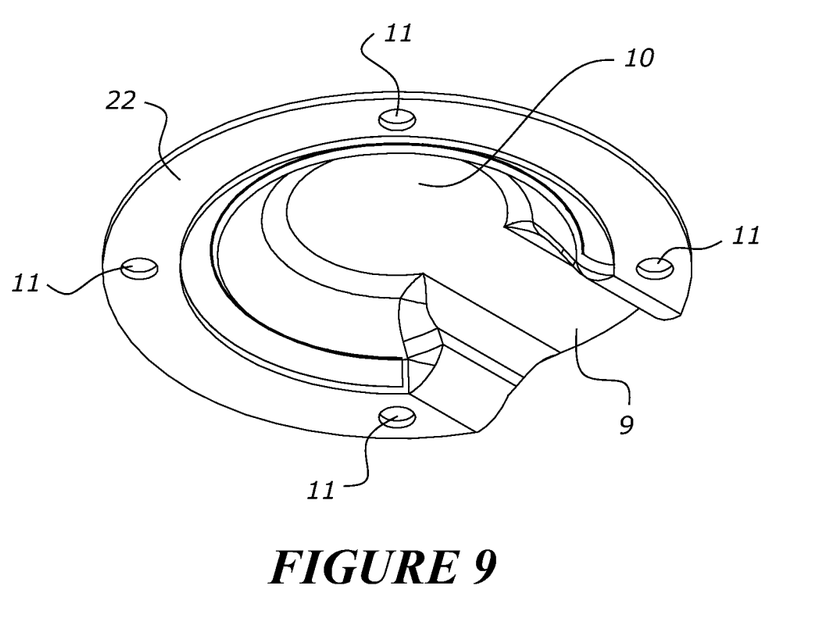
FIG. 9 is an underside perspective view of the fixing component.
Figure 10:
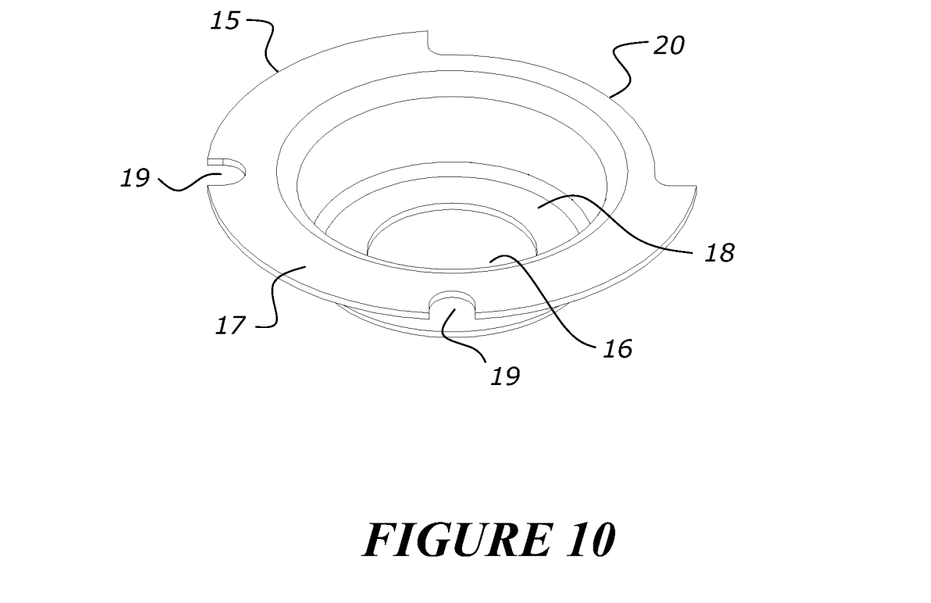
FIG. 10 is a top side perspective view of the entry component.
Figure 11:
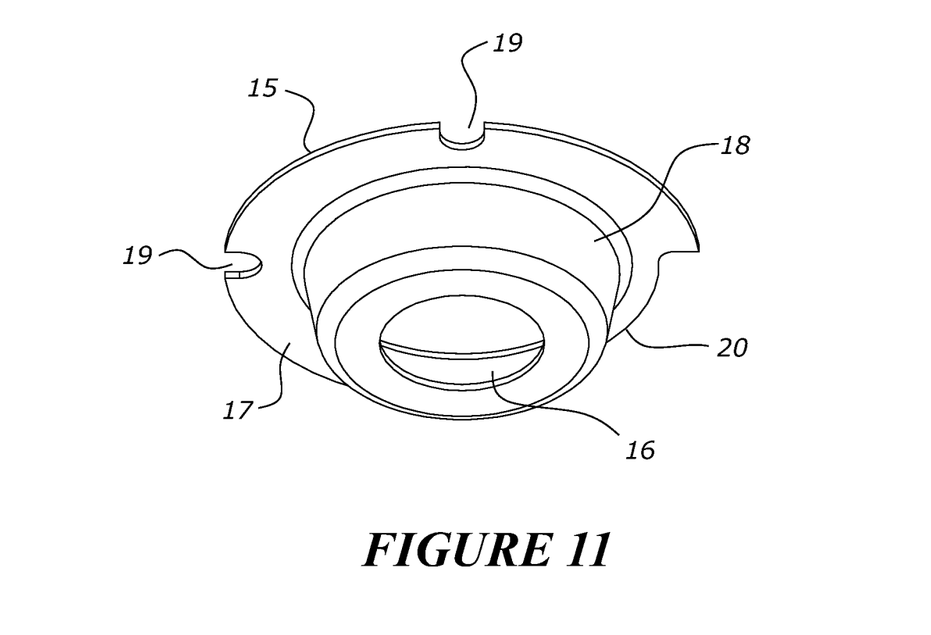
FIG. 11 is an underside perspective view of the entry component.

The fixing component 8 is shown separately in FIGS. 8 and 9.

In the embodiment shown the fixing component 8 comprises a cover (hereinafter referred to as a cover portion) over the seal body 1. The fixing component or cover portion 8 comprises a raised peripheral part 9 shaped to accommodate the greater thickness peripheral part 4 of the seal body 1, and a raised central part 10. The cover portion 8 also has cover portion apertures 11, which align when the cover 8 is in place over the seal body 1 in use, with similar seal body apertures 12 though the seal body, for fixings or fasteners (for example as shown in FIG. 1) such as screws which, when the seal system is installed, are inserted through the cover portion 8 and extend through the seal body apertures 12 and into the surface or a substrate below the surface. Alternatively, fasteners may comprise small bolts which pass through the cover portion 8 and seal body apertures 12, and which may pass through holes in the wall substrate to nuts or similar on the opposite side of such a wall. In-use, the fasteners can be tightened sufficiently so that the seal system is held in place and also so that that the cover portion 8 applies a moderate degree of compression to the seal body 1 evenly around the seal body 1 to ensure an effective seal between the cover portion 8 and the seal body 1 upon which the cover portion 8 is to be seated against and in turn the seal body 1 via the at least one lip seal and wall surface W.

The cover portion apertures 11 may for example be those as shown in FIGS. 3, 4, 8, 9 or FIGS. 13-18, 21. FIGS. 13-18 and 21 illustrate an embodiment of cover portion apertures 11 in which the apertures are suitably sized and arranged cut-outs of the cover portion which, like the cover portion apertures 11 of FIGS. 3,4,8, 9 are arranged to be aligned with the seal body apertures 12. In this manner, the apertures of the cover portion and the sealing body can be aligned for correct receipt of a fastener or fixing without the user having to drill holes or modify the seal system in any way. Such a pre-determined alignment of the cover portion apertures and seal body apertures simplify installation for an end-user and can also help prevent inadvertent installation or even inadvertent use of fasteners or fixings which may then interfere adversely with the at least one lip seal providing for the seal between the underside of the seal body 1 and the surface to which the seal body is to be sealed.

The seal body apertures 12 may be pre-formed, so as to be of a pre-determined location. The cover portion apertures 11 can then also be provided so as to be aligned with the pre-formed locations of the seal body apertures.

In the embodiment shown, the seal body 1 also comprises one or more sealing lips or protrusions 13 on the seal face above the enlarged side part 4 comprising cable passages 3, to ensure a good seal to the underside of the cover portion 4 at this point—for example, see at least FIGS. 6, 13-16, 19, 20 which illustrate such one or more sealing lips or protrusions or ribs.

Typically, the cover portion 8 or other fixing component is formed of a stiffer or more rigid material than the seal body 1. For example, the cover may be pressed metal or a rigid plastic, while the seal body 1 can be formed from a rubber or silicone or other resiliently soft polymeric material.

In the embodiment shown the fixing component comprises the cover portion 8 which extends when fitted over most of the upper or outer face of the seal body 1, but in another embodiment the fixing component or cover portion 8 may instead simply comprise a ring which overlies an outer peripheral part of the seal body (with the fasteners or fixing still passing through this ring and the seal body via the cover portion apertures and seal body apertures). In this embodiment the seal body 1 itself may be formed with an integral domed cover of the seal material, for example.

Also in the embodiment shown the seal body 1 may have an annular or circular ring form and the fixing component or cover portion 8 can be shaped to match, but in another embodiment the seal body may have other shapes such as oval, square, or other multi-sided shapes for example, and the fixing component or cover portion 8 will be suitably shaped to match for seating upon the face of the sealing body.

In yet another embodiment, the cable exit passage or passages 3 instead of being wholly enclosed and defined by the side of the seal body may comprise upward facing grooves in the seal body, which receive the cable(s) and are closed by the cover portion 8 when fitted in place upon the seal body. The cover portion 8 for example on the inside of the raised peripheral part 9 if provided, may comprise a section of relatively soft sealing material to provide for a sealing surface against the cables.

Figure 12:
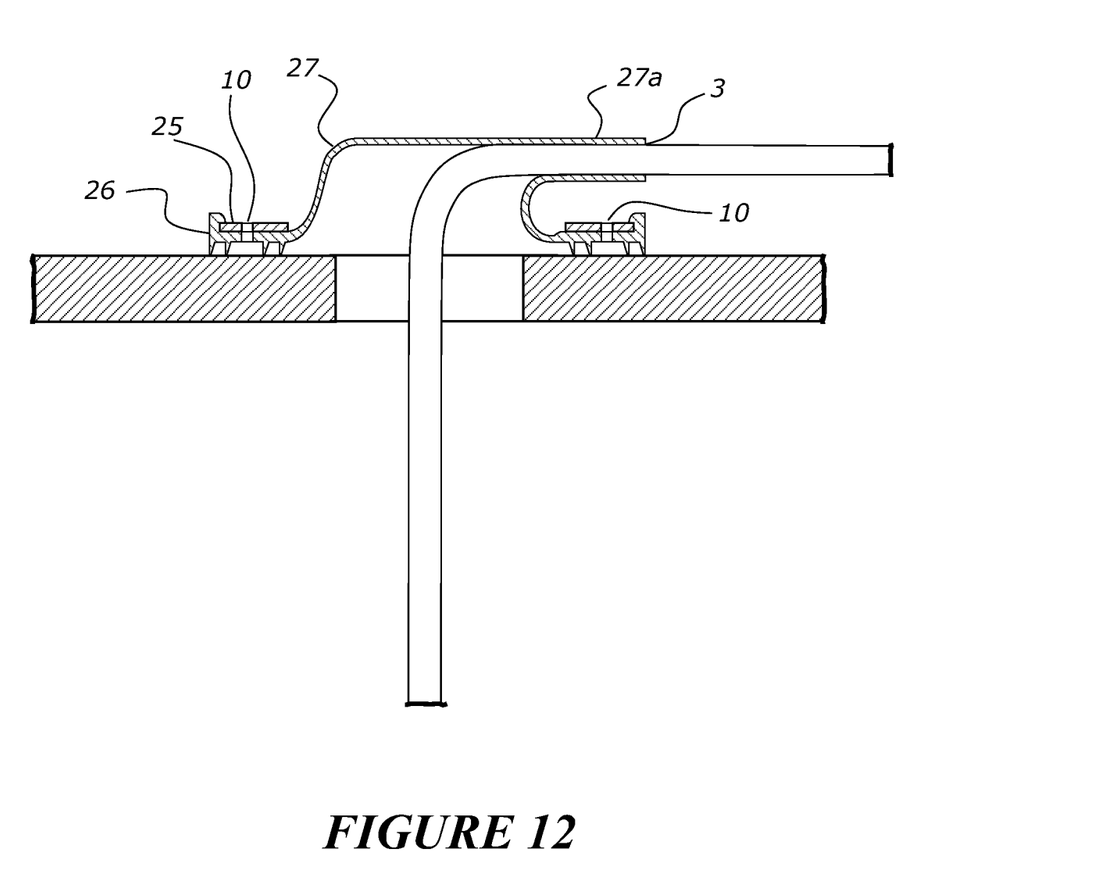
FIG. 12 is a cross-section view of another embodiment of a seal system of the invention.

FIG. 12 illustrates a cross-section view of another embodiment of a seal system of the invention in which the fixing component comprises a ring 25 which overlies an outer peripheral part of the seal body 26, with the fasteners, in-use, still passing through apertures 10 in this ring 25 and apertures 12 in the seal body. The seal 26 is in other respects the same as in the embodiment of FIGS. 1 to 11 but in this embodiment is formed with an integral domed cover part 27, as shown. The cover part 27 of the seal body itself may be formed of the seal material or a co-moulded or over-moulded relatively harder or more rigid material, for example. The cable or cables exit(s) through a cable exit aperture 3 or apertures in a laterally extending nose or nozzle 27a formed in the cover part 27 of the seal. The exit nose or nozzle 27a may direct the cable(s) parallel to or at a non-zero angle to the wall surface, and may comprise multiple cable exit apertures of the same or different sizes as referred to above.

In the embodiment of FIGS. 1 to 11, the seal system also comprises another component 15 herein referred to for convenience as a lead up component, adapted to interface to the seal body 1 and comprising an aperture 16 for entry of the cable(s) into the seal system. This lead up component 15 is shown separately in FIGS. 10 and 11. It comprises an annular rim 17 of a similar diameter to the cover portion 8, and a dish shaped centre part 18. It is of a similar diameter to the cover portion 8 and, in-use, the rim 17 interfaces to the upper/outer side of the seal body 1 (the side in use opposite wall W). When the seal system is being installed it is fitted into the seal first, and then (with cables in place) the cover portion 8 is installed. The rim 22 of the cover portion 8 will engage the rim 17 of the lead up component 15, which also has lead up component apertures 19 shaped for receipt or accommodating of the fasteners or fixings to pass through and a cut-out portion 20 of the rim to accommodate the enlarged seal side part 4.

Referring to FIG. 6, on its upper or outer face the seal body 1 has a recessed annular part 23 inside of an outer wall 24, to accommodate the thickness of the lead up component 15 and the cover portion 8, but in an alternative form this may not be provided and these may simply sit proud of the seal surface. The part 23 can provide for a face upon which the lead up component may be seated.

Where as shown in FIGS. 1 and 2, the cables on the entry side of the wall W are housed in an outer lead up tube 21 this may attach to the lead up component 15, either permanently at manufacture of the seal system including component 15, or at installation using a clamp for example. Alternatively where there is no lead up tube 21 the seal system still may comprise the lead up component 15, which then for example if formed of metal it may comprise an enlarged softer part such as a grommet around the rim of the hole through which the cables pass or the rim may be formed with a turned metal edge, or alternatively again in another embodiment the seal system may not include the lead up component 15.

The embodiment of FIG. 12 may or may not comprise such a lead up component 15.

In further embodiments, for example as shown by FIGS. 13-24, reference is made to the cover portion 8 which illustrates the cover portion apertures 11 which may be formed as cut-outs of the cover portion 8. In this manner, the cover portion apertures 11 (such as the cut-outs) can be shaped to co-locate with a ledge or other formations of the sealing body 1 apertures 12. In this manner, the cover portion apertures 11 can be more easily or positively co-located with the sealing body apertures 12. This provides for a simplification for the assembly of the cover portion 11 with the sealing body 1 and further aides in avoidance of wrong assembly by an end user.

The cover portion 8 may be also be connectable to the lead up component 15, either via a suitable connection system or by connection of these components at the factory to further avoid incorrect assembly and incorrect alignment of the cover portion 8 with the lead up component 15 which in turn allows for simplified alignment with the apertures 12 of the sealing body 1. The connection of the cover portion 8 with the lead up component 15 can be achieved via spot welds, or via a connection system which enables either a permanent connection to be made or a disconnectable connection to be made. In any connection, whether permanent or disconnectable, the cover portion 8 and lead up component 15 are to be connected in a manner such that their respective apertures 11, 19 are correctly aligned.

Figure 13:
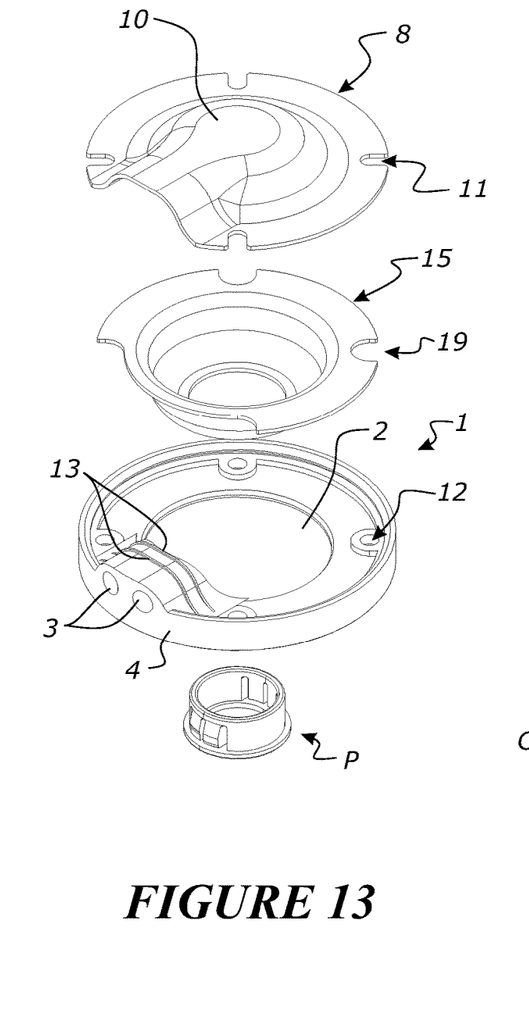
FIG. 13 illustrates an exploded form of a sealing system with the cover portion 8, lead up component 15, sealing body as illustrated. Also shown is a sheath or sleeve or grommet type component which can be attachable to the lead up component to provide for physical protection of the cable(s) from being damaged at the entry into the sealing system via the lead up component.
Figure 15:
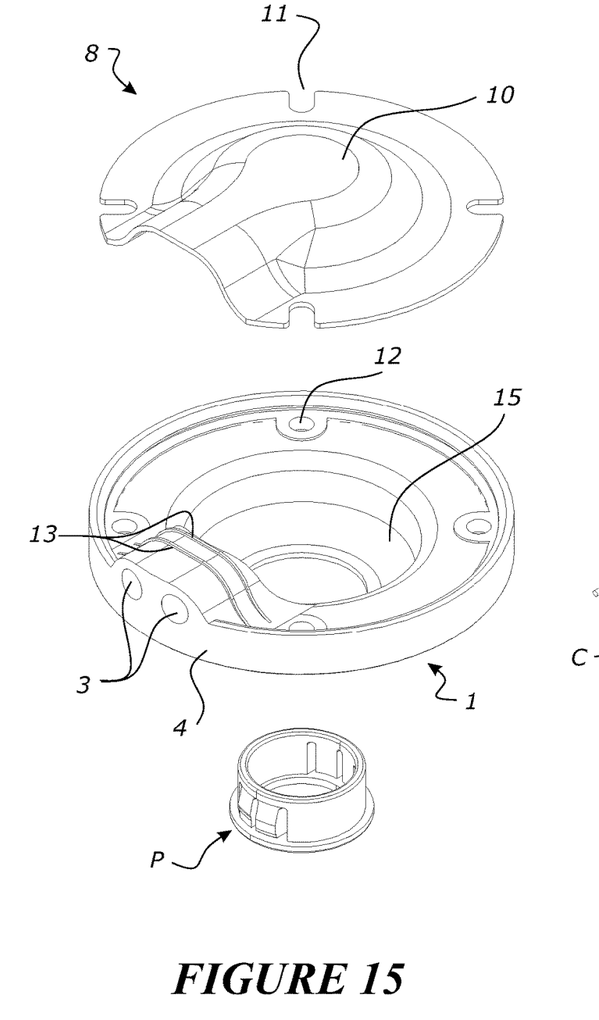
FIG. 15 illustrates the same arrangement as FIG. 13, but where the lead up component has been seated into place within the seal body, noting the lead up component apertures co-located about the seal body apertures.

FIG. 13 illustrates an exploded form of a sealing system with the cover portion 8, lead up component 15, sealing body 1 as illustrated. Also shown is a sheath or sleeve or grommet type component which can be attachable to the lead up component 15 to provide for physical protection of the cable(s) from being damaged at the entry into the sealing system via the lead up component. FIG. 15 illustrates FIG. 13 where the lead up component has been seated into place within the sealing body 1.

Figure 14:
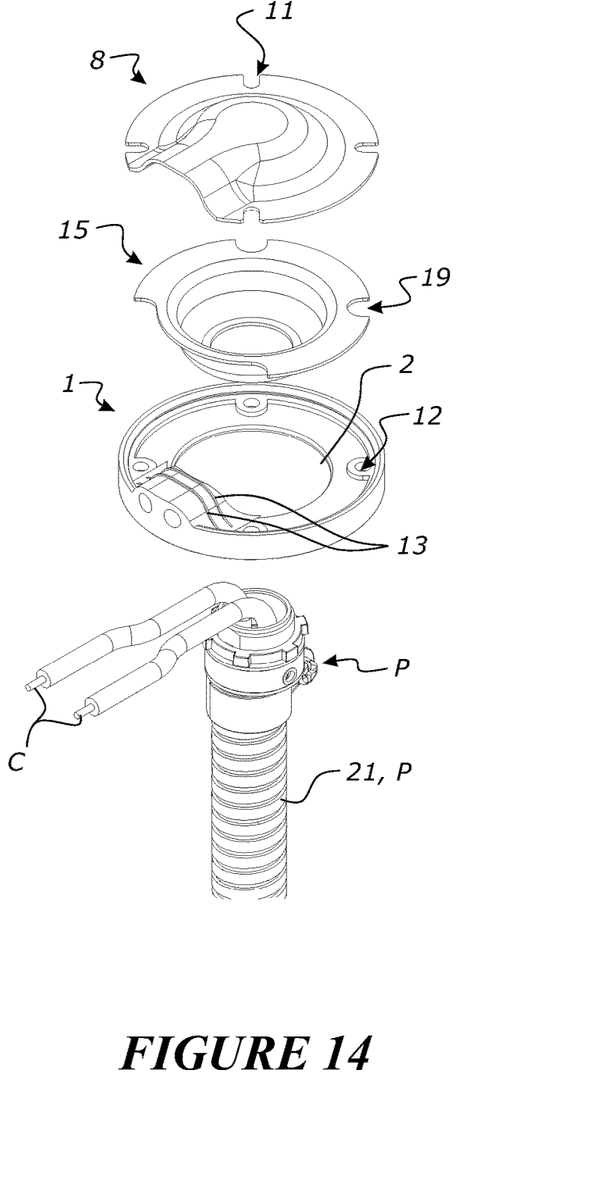
FIG. 14 illustrates the same arrangement as FIG. 13, but where the cable(s) are provided with their own sheath or sleeve as physical protection from damage.
Figure 16:
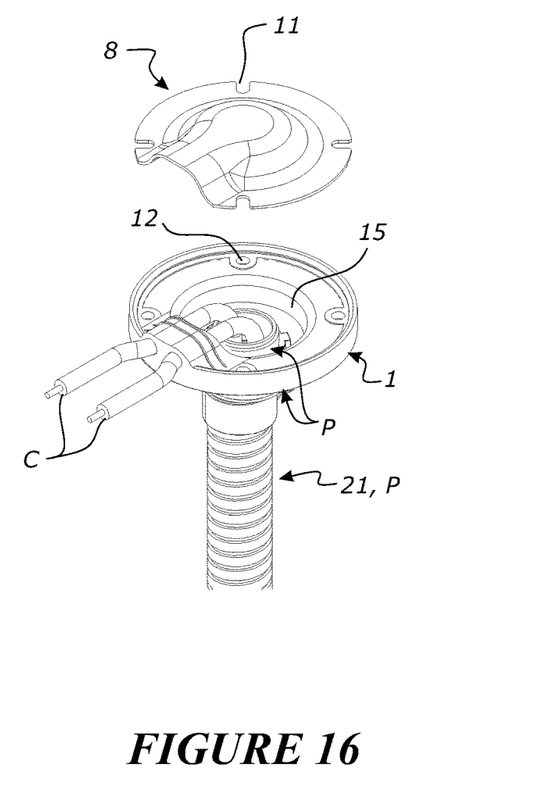
FIG. 16 illustrates the same arrangement as FIG. 14, but where the lead up component has been seated into place within the seal body, and the cables are housed within their own sheath or sleeve and are in-situ having been provided inserted into the lead up component and two cables have been arranged to be passed through the passages.

FIG. 14 illustrates the same arrangement as FIG. 13, but where the cable(s) are provided with their own sheath or sleeve as physical protection from damage. FIG. 16 illustrates FIG. 14, but where the lead up component 15 has been seated into place within the sealing body 1, and the cables are housed within their own sheath or sleeve and are in-situ having been provided inserted into the lead up component and two cables have been arranged to be passed through the passages 3.

Figure 17:
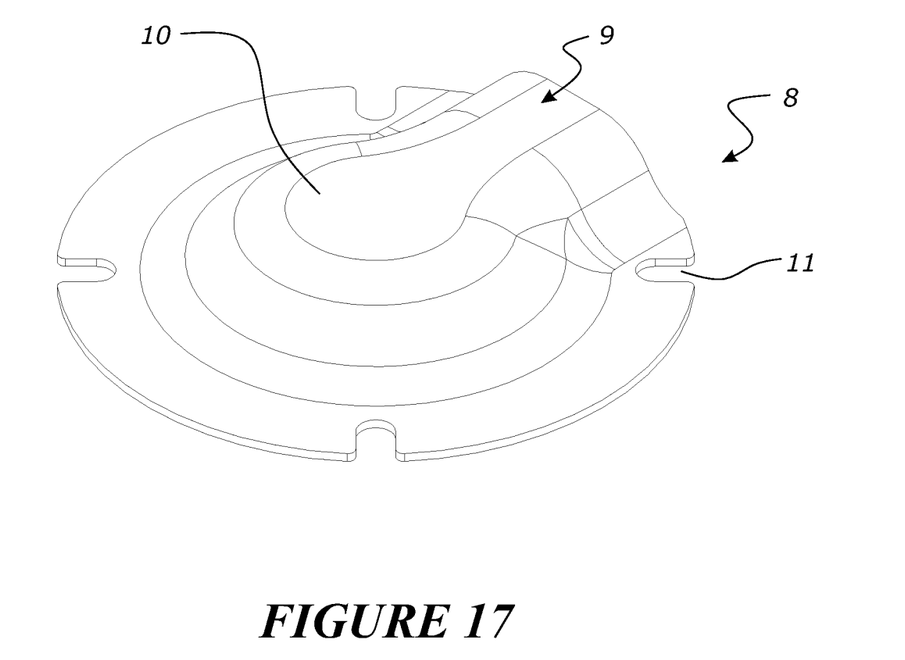
FIGS. 17 and 18 illustrate close-up views respectively of a top perspective view and a bottom perceptive view of an embodiment of a cover portion, demonstrating a raised part and fixing component apertures spaced about the perimeter of the fixing component.
Figure 18:
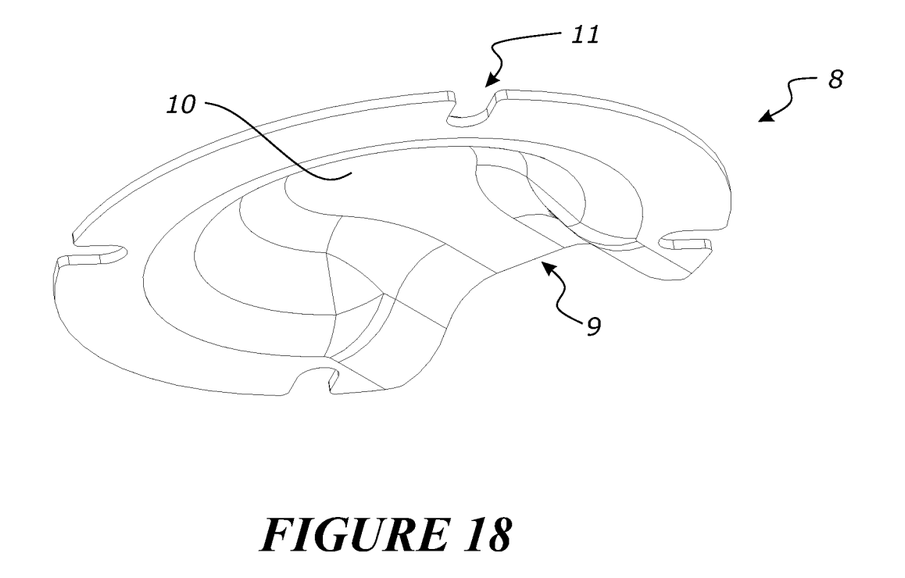

FIGS. 17 and 18 illustrate close-up views respectively of a top perspective view and a bottom perceptive view of an embodiment of a cover portion 8.

Figure 19:
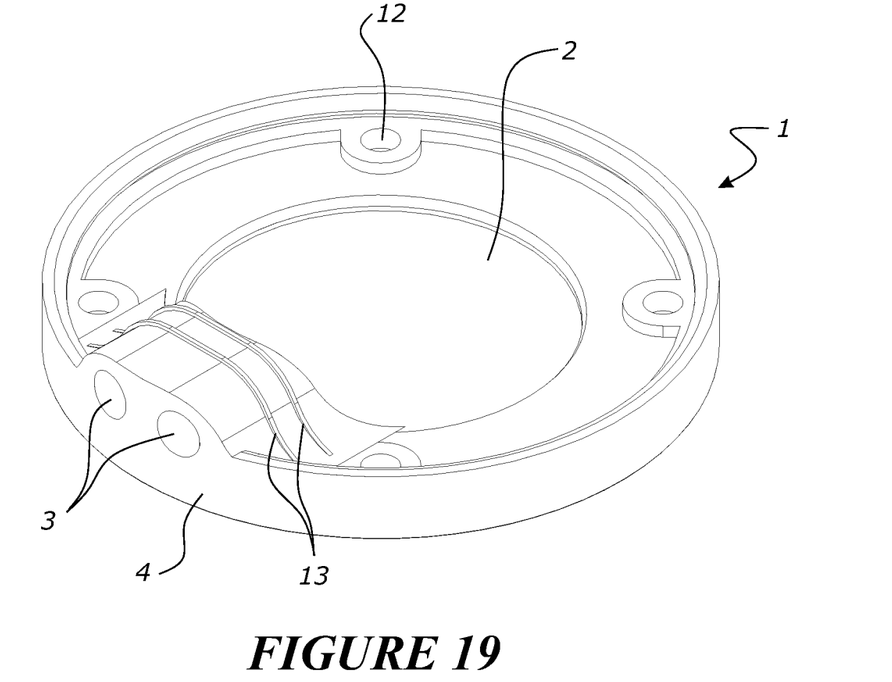
FIGS. 19 and 20 illustrate close-up views respectively of a top perspective view and a bottom perceptive view of an embodiment of a sealing body, demonstrating the face upon which the lead up component is to be seated, the seal body apertures, the ribs for sealing upon an underside surface of the fixing component and passages for providing exit pathways for cables through a side of the seal body.
Figure 20:
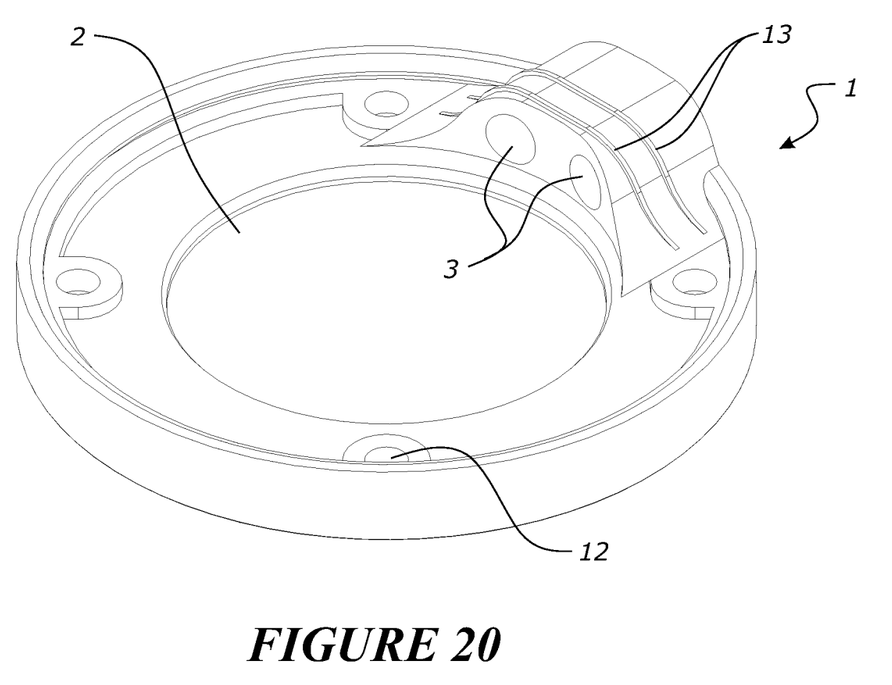
Figure 21:
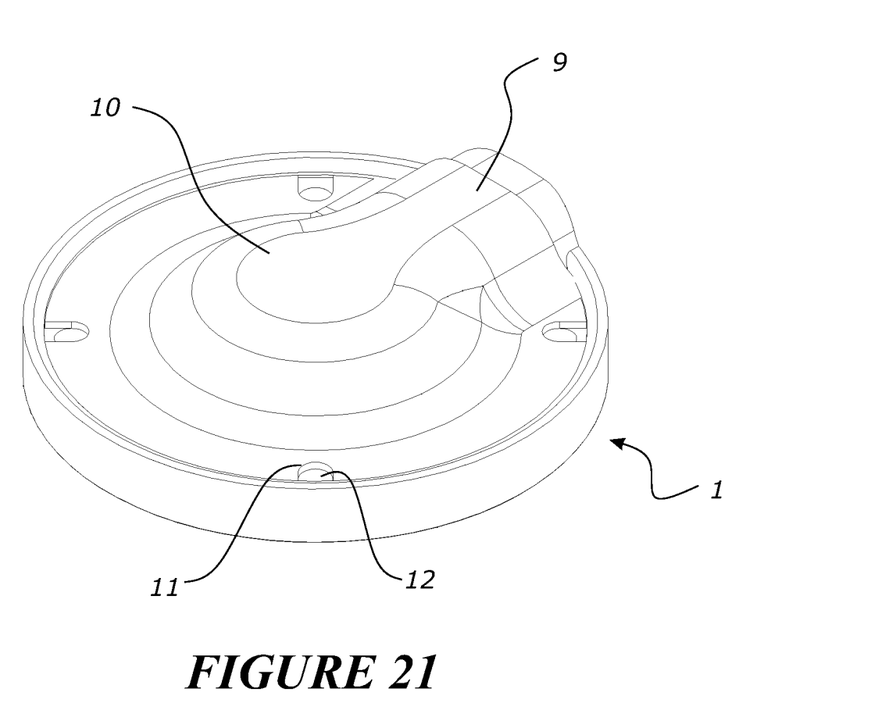
FIG. 21 illustrates a top perspective view of one embodiment of an assembled fixing component (or cover portion) seated upon a seal body.
Figure 22:
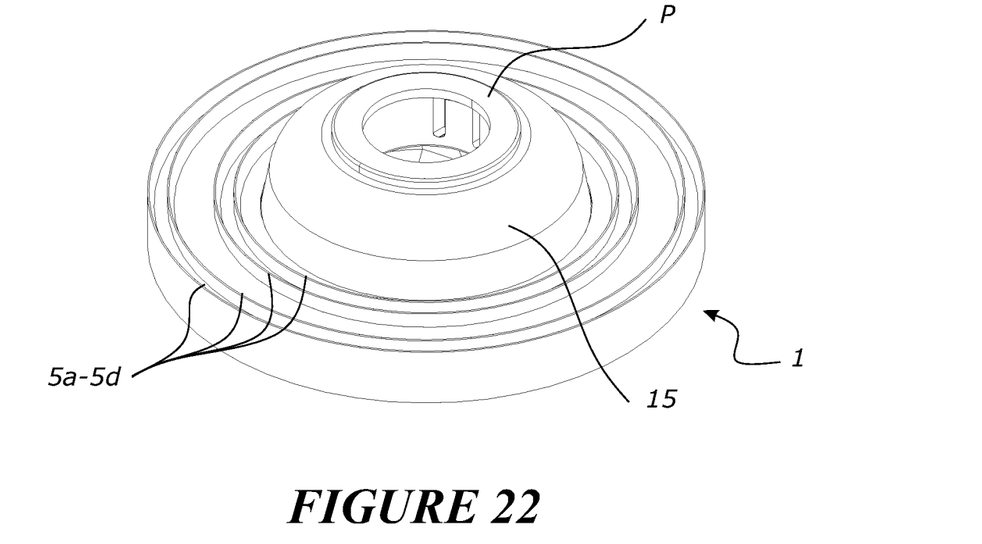
FIG. 22 illustrates a bottom perspective view of one embodiment of a seal body showing a lead up component in-situ, with four lip seals spaced radially about the underside surface of the seal body, and with a grommet or sheath or sleeve type connection in place within the aperture of the lead up component to provide physical protection for the cables (not shown) from damage.

FIGS. 19 and 20 illustrate close-up views respectively of a top perspective view and a bottom perceptive view of an embodiment of a sealing body 1.

Figure 23:
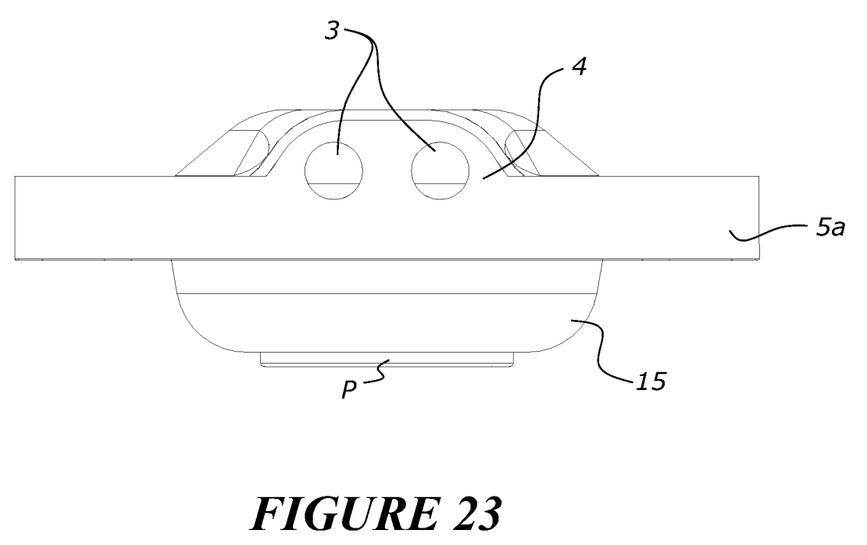
FIG. 23 illustrates one embodiment of an assembled seal system from a side view (when looking at a pair of exit passages).
Figure 24:
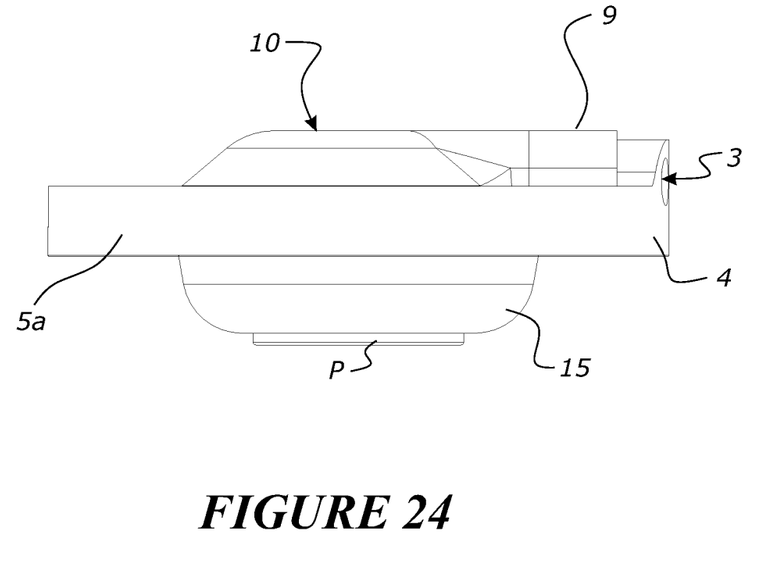
FIG. 24 illustrates FIG. 23 when rotated through 90°.

FIGS. 21-24 illustrate, respectively; a top perspective view, a bottom perspective view, a side view (when looking at a pair of exit passages 3), and a 90° rotated further side view from the view of FIG. 23, of an assembled cover portion 8 and lead up component 15 with a sealing body 1. Cables are not shown, nor are fixings or fasteners.

In the above, cables are referred to but alternatively the seal system may be used with pipes carrying liquid or gas.

The foregoing description of the invention includes preferred forms thereof. Modifications may be made thereto without departing from the scope of the invention as defined in the accompanying claims.

The invention claimed is:

1. A seal system for sealing between an elongate element such as a cable and a surface or substrate around an aperture in the surface through which the elongate element passes, comprising:
   a seal body to surround the aperture and seal against the surface or substrate around the aperture, the seal body comprising at least one passage for penetration of the elongate element through the seal body at a side of the seal body, said at least one passage providing for a seal to the elongate element, and
   a fixing component adapted to be attached over at least part of the seal body and/or through the seal body to seal with the surface or substrate;
   wherein the fixing component comprises of fixing component apertures and the seal body comprises of seal body apertures, wherein the fixing component apertures and seal body apertures are arranged respectively to be aligned with each other when the fixing component is in place over or upon the seal body.

2. The seal system of claim 1, wherein the seal body comprises an entry aperture through the seal body and the at least one passage through a side of the seal body comprises an exit aperture.

3. The seal system of claim 2, wherein the at least one passage passes laterally through the side of the seal body at a non-zero angle to said entry aperture.

4. The seal system of claim 3, wherein said non-zero angle is an angle which is substantially perpendicular to an axis through said entry aperture or to a major plane of the seal body.

5. The seal system of claim 1, wherein the seal body has an enlarged thickness at the side of the seal body comprising the at least one passage for penetration of the elongate element through the seal body.

6. The seal system of claim 1, wherein the seal body comprises at least one sealing lip or protrusion around an under surface of the seal body for sealing to the surface.

7. The seal system of claim 1, wherein the seal body comprises at least one sealing lip or protrusion around the at least one passage through the side of the seal body for sealing to the elongate element.

8. The seal system of claim 1, wherein the seal body comprises at least one sealing lip or protrusion around an upper surface of the seal body for sealing to the fixing component.

9. The seal system of claim 1, wherein the seal body has a peripheral thickness which is greater at said side of the seal body comprising the least one passage for penetration of the elongate element through the side of the seal body, and the fixing component comprises a raised peripheral part shaped to accommodate the greater thickness peripheral part of the seal body.

10. The seal system of claim 1 wherein the fixing component comprises a cover over the seal body.

11. The seal system of claim 10, wherein the cover comprises a raised central part.

12. The seal system of claim 1, wherein in-use, the fixing component apertures and seal body apertures are configured to receive a fastener therethrough for fixing of the fixing component and the seal body to the surface or a substrate below the surface.

13. The seal system of claim 1, further comprising a lead up component adapted to interface to the seal body and comprising an aperture for entry of the elongate element into the seal system.

14. The seal system of claim 13, wherein said lead up component attaches to an outer lead up tube for the elongate element to the seal system.

15. The seal system of claim 13, wherein said lead up component comprises of lead up component apertures which are arranged to be aligned with respective aperture alignments of said fixing component and sealing body.

16. The seal system of claim 13, wherein said lead up component is connected to said fixing component in a pre-arranged manner, such that said lead up component apertures are aligned with fixing component apertures.

17. A seal system for sealing between an elongate element such as a cable and a surface or substrate around an aperture in the surface through which the elongate element passes, comprising:
   a seal body to surround the aperture and seal against the surface or substrate around the aperture, the seal body comprising a peripheral part and a cover part bounded by the peripheral part, the cover part comprising at least one passage for penetration of the elongate element through the cover part of the seal body and at a non-zero angle to an entry aperture to the seal body, which directs the elongate element to one side of the seal body, and
   a fixing component adapted to attach over the peripheral part of the seal body and/or through the seal body to seal to seal with the surface or substrate;
   wherein the fixing component comprises of fixing component apertures and the seal body comprises of seal body apertures, wherein the fixing component apertures and seal body apertures are arranged respectively to be aligned with each other when the fixing component is in place over or upon the seal body.

18. The seal system of claim 17, wherein the at least one passage through said cover part of the seal body at a non-zero angle is in a laterally extending nose or nozzle portion of the cover part.

19. A seal system for sealing between an elongate element such as a cable and a surface or substrate around an aperture in the surface through which the elongate element passes, comprising:
   a seal body to surround the aperture and seal against the surface or substrate around the aperture, the seal body comprising at least one passage for penetration of the elongate element through the seal body at a side of the seal body, said at least one passage providing for a seal to the elongate element,
   a fixing component adapted to be attached over at least part of the seal body and/or through the seal body to seal with the surface or substrate; and
   a lead up component adapted to interface to the seal body and comprising an aperture for entry of the elongate element into the seal system.

20. The seal system of claim 19, wherein said lead up component attaches to an outer lead up tube for the elongate element to the seal system.

21. The seal system of claim 19, wherein said lead up component comprises of lead up component apertures which are arranged to be aligned with respective aperture alignments of said fixing component and sealing body.

22. The seal system of claim 19, wherein said lead up component is connected to said fixing component in a pre-arranged manner, such that said lead up component apertures are aligned with fixing component apertures.

23. A seal system for sealing between an elongate element such as a cable and a surface or substrate around an aperture in the surface through which the elongate element passes, comprising:
   a seal body to surround the aperture and seal against the surface or substrate around the aperture, the seal body comprising a peripheral part and a cover part bounded by the peripheral part, the cover part comprising at least one passage for penetration of the elongate element through the cover part of the seal body and at a non-zero angle to an entry aperture to the seal body, which directs the elongate element to one side of the seal body,
   a fixing component adapted to attach over the peripheral part of the seal body and/or through the seal body to seal to seal with the surface or substrate; and
   a lead up component adapted to interface to the seal body and comprising an aperture for entry of the elongate element into the seal system.

24. The seal system of claim 17, wherein the at least one passage through said cover part of the seal body at a non-zero angle is in a laterally extending nose or nozzle portion of the cover part.

\* \* \* \* \*